United States Patent [19]

Hosoe et al.

[11] 4,315,674
[45] Feb. 16, 1982

[54] FOCAL POINT DETECTING SYSTEM

[75] Inventors: Kazuya Hosoe, Machida; Nobuhiko Shinoda, Tokyo; Minoru Fukuda, Yokohama; Takashi Kawabata, Kamakura; Takao Kinoshita, Tokyo; Tadashi Ito, Yokohama, all of Japan

[73] Assignee: Canon Kabushiki Kaisha, Tokyo, Japan

[21] Appl. No.: 150,959

[22] Filed: May 19, 1980

[30] Foreign Application Priority Data

May 23, 1979 [JP] Japan .................. 54-63371

[51] Int. Cl.³ .............. G03B 7/08; G01J 1/20; G03B 17/20
[52] U.S. Cl. .................... 354/25; 250/201; 354/53
[58] Field of Search ............ 354/25, 53, 289; 250/201

[56] References Cited

U.S. PATENT DOCUMENTS

| | | | |
|---|---|---|---|
| 3,504,610 | 4/1970 | Dönitz | 354/25 |
| 3,529,528 | 9/1970 | Leitz | 354/53 X |
| 3,776,639 | 12/1973 | Stauffer | 250/201 X |
| 4,117,325 | 9/1978 | Holle et al. | 250/201 X |
| 4,230,401 | 10/1980 | Tokutomi et al. | 354/25 |

FOREIGN PATENT DOCUMENTS

| | | | |
|---|---|---|---|
| 2634655 | 2/1978 | Fed. Rep. of Germany | 354/25 |
| 41-14501 | 8/1966 | Japan | 354/25 |
| 1300914 | 12/1972 | United Kingdom | 354/53 |

*Primary Examiner*—Donald A. Griffin
*Attorney, Agent, or Firm*—Toren, McGeady & Stanger

[57] ABSTRACT

A focal point detection system for detecting the focus adjusting state of an image forming lens during its focusing operation on an object is disclosed. The system comprises a focus detection circuit which produces a detection output that varies with focusing of the lens on the object; a plurality of display elements are provided for display of the focusing state of the lens; and a display control circuit which enables the display elements to display a greater number of focusing states than the number of these display elements through selective combinations of these elements on the basis of the output of the focus detection circuit. The system is capable of displaying intermediate focusing states such as a slightly near-focus state, a slightly far-focus state, and the like in addition to in-focus, near-focus, and far-focus states, so that the focusing state can be displayed stepwise in a detailed manner.

8 Claims, 5 Drawing Figures

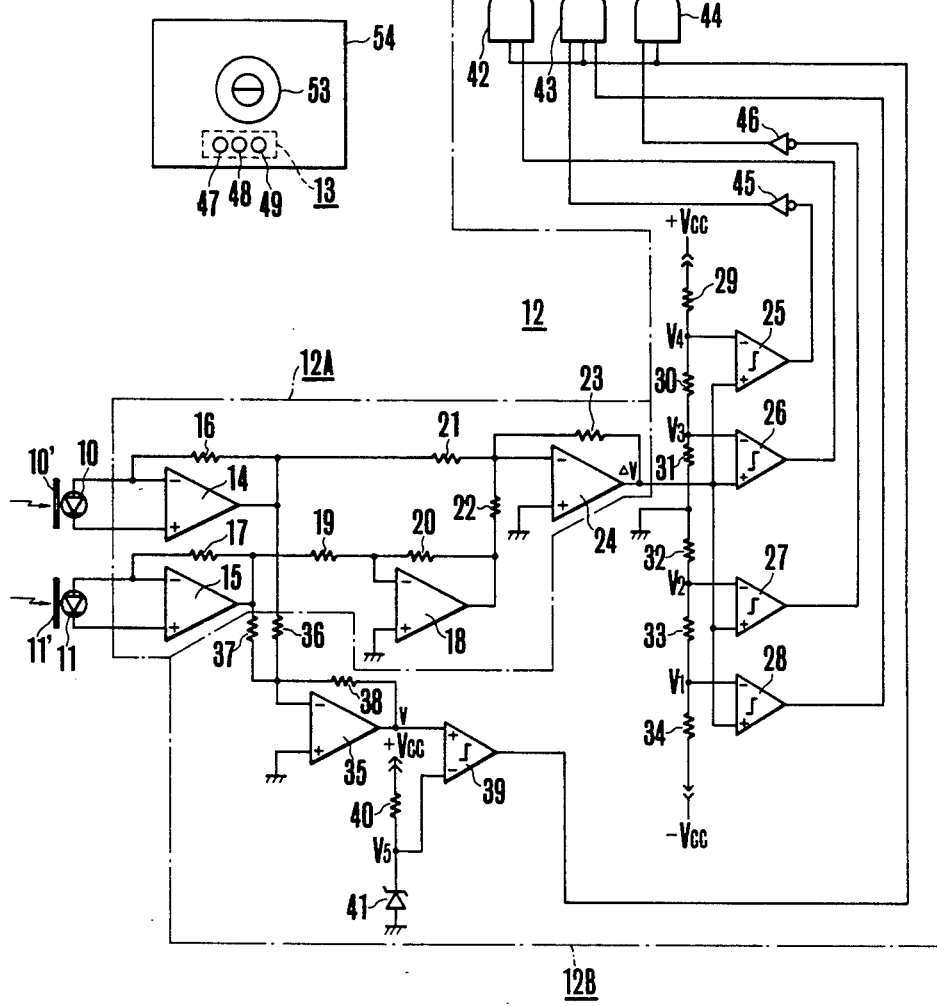

FOCAL POINT DETECTING SYSTEM

BACKGROUND OF THE INVENTION

1. Field of the Invention

This invention relates to a focal point detection system and more particularly to an improvement on a system for displaying the results of focal point detection.

2. Description of the Prior Art

With regard to devices for displaying the focus adjusting state of an image forming lens in an optical system and particularly in an optical apparatus such as a photographic camers, various arrangements have been disclosed. For example, U.S. Pat. No. 3,529,528 discloses a system that uses a meter as a display means, while West German Patent Publication No. 2,537,482 discloses a system that uses LEDs (light emitting diodes) as display means.

In the former, focusing state can be displayed at various points such as an in-focus point, defocus points including near-focus and far-focus points and also the degree of such defocus points. These focusing states are not very clearly displayed when presented on a meter. Particularly, in cases where such a display system is applied to a small apparatus such as a camera, the display tends to be affected by the size of the system, camera holding posture, and the like. The display system moreover, is not always suitable for such applications. In the latter case, although the system is capable of displaying in-focus, near-focus and far-focus points, it is incapable of displaying the degree of a defocus state. Therefore, the display becomes critical in the neighborhood of an in-focus point. This makes the latter system difficult to operate.

SUMMARY OF THE INVENTION

It is the principal object of this invention to eliminate the shortcomings of conventional systems.

It is another object of this invention to eliminate the shortcomings of conventional systems by means of an extremely simple arrangement.

It is a further object of this invention to provide a focal point detection system which is very simple in structural arrangement; highly suitable for a small apparatus such as a camera; and is capable of providing a stepwise, very clear and detailed display of the focus adjusting state of an image forming lens during its focusing operation on an object to be photographed.

To attain these objects, the invention comprises a focus detection circuit which produces a detection output that varies with the focusing operation of the lens on the object; a plurality of individually independent display elements are arranged to display the focusing point of the lens while it is being focused on the object; and a display control circuit that enables the display elements to illustrate a greater number of focusing points than the number of these display elements through selective combinations of the display elements in response to the output of the focus detection circuit. The focal point detection system is thus arranged to be capable of presenting a stepwise and yet detailed display of the focusing state of the image forming lens.

The focal point detection system of the present invention eliminates the shortcomings of the conventional focal point detection systems by producing a detailed display of the degree of defocusing from an in-focus point and the direction of defocusing in addition to displaying an in-focus state of the lens through the use of the plurality of display elements such as LEDs (light emitting diodes) or the like. With this novel system the focusing degree can be readily found through a visual observation of the display. In a case in which it is not necessary to find a critical in-focus point, as for example, in photographing a bright object, the system enables the photographer to quickly take a sharp picture by stopping the lens at a point in which a suitable in-focus state is displayed because the depth of focus increases when the object is bright. Conversely, in cases in which a dark object is to be photographed, the depth of focus decreases. In such a case, therefore, it is necessary to focus as precisely as possible. This requirement can be easily met by the novel system under consideration which readily permits selective focusing through observation of the display. In other words, it is an advantageous feature of the invented focal point detection system that its clear display readily enables the photographer to make either a coarse focusing adjustment or a fine focusing adjustment of the lens, as desired.

These and other objects, features and advantages of the invention will become apparent from the following description of embodiments thereof taken in connection with the accompanying drawings.

BRIEF DESCRIPTION OF THE DRAWINGS

FIG. 4 is a diagram that shows an electric circuit for use in the focal point detection system that is shown in FIG. 1;

FIG. 5 is a schematic view that illustrate the focusing state display elements of the focal point detection system shown in FIG. 1 as arranged within a camera view.

DETAILED DESCRIPTION OF PREFERRED EMBODIMENTS

Figure 1:
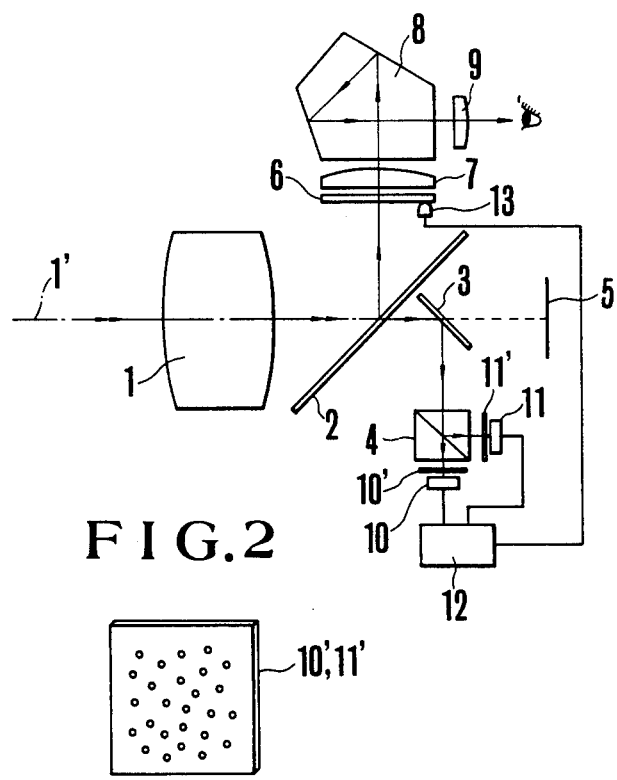
FIG. 1 is a schematic view of an embodiment of the invention that shows the arrangement of a single-lens reflex camera and particularly the optical system thereof, provided with a focal point detection system.
Figure 2:
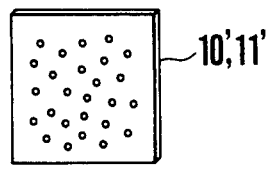
FIG. 2 is an illustration of an example of a mask disposed immediately in front of a photoelectric conversion element for use in the focal point detection system shown in FIG. 1.

Referring to FIG. 1 which shows an embodiment of the invention, there is illustrated, a photographic lens 1, the optical axis of which is indicated by a reference numeral 1'; a quick return mirror 2 which is arranged to be at least partially semi-transparent; an auxiliary mirror 3 which is arranged to reflect downward light from the mirror 2; a beam splitter 4 which splits the reflected light from the mirror 3 into two beams of light; a film surface 5; a focusing glass 6; a condenser lens 7; a pentagonal prism 8; an eyepiece 9; photoelectric conversion elements 10 and 11 which are each optically aligned to receive respectively, one of the two split light beams coming from the beam splitter 4; masks 10' and 11' which are prepared in the form as shown in FIG. 2 and which are disposed immediately in front of the photoelectric conversion elements 10 and 11. The masks 10' and 11' are arranged in the same position relative to each other as the elements 10 and 11. A focus detection and display circuit 12 also is shown in FIG. 1.

The focus detection and display circuit 12 detects the focusing state of the photographic lens 1, for example, by comparing the outputs of the photoelectric conversion elements 10 and 11 and controlling an indicator 13 according to the results of the detection. Further details of this circuit are as will be described hereinafter with reference to FIG. 4. The indicator 13 is provided, for example, with a plurality of LEDs (light emitting diodes) which are suitably arranged relative to the view finder optical system 6, 7, 8 and 9 to permit visual observation of the lighting state of each LED within the view finder of the camera.

The masks 10' and 11' which are positioned immediately in front of the photoelectric conversion elements 10 and 11, respectively are disposed in planes that are equidistantly in front of and behind a predetermined focal plane 5', which is optically equivalent to the film surface 5. With the masks arranged in the foregoing manner, when the imaging plane of the photograhic lens 1 comes to the predetermined focal plane 5', the images on the masks 10' and 11' enjoy equal degrees of sharpness. In the circumstance, the total quantity of light that is incident upon each one of the photoelectric conversion elements 10 and 11 that passes through the small holes provided in the respectively associated masks 10' and 11' becomes equal to the total quantity of light that is incident upon the other photoelectric conversion element coming through the small holes of the other mask.

Figure 3:
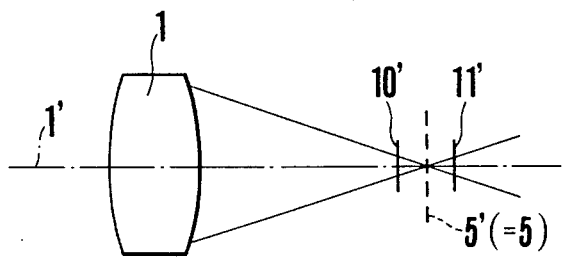
FIG. 3 is a schematic drawing that shows the position of the mask relative to the optical axis of an image forming lens.

On the other hand, when the imaging plane of the lens 1 comes to a near-focus point FIG. 3, the image on the mask 10' becomes sharper than the image on the mask 11' and causes an increase in the degree of convergence of the light flux on the mask 10'. The quantity of the light passing through the mask 10', therefore, becomes greater than that of the light passing through the mask 11'. This causes the output of the photoelectric conversion element 10 to be greater than that of the other element 11. Conversely, when the imaging plane of the lens 1 comes to a far-focus point (i.e. when it deviates to a point in the rear of the predetermined focal plane 5'), the output of the element 11 becomes larger than the other converting element 10. Therefore, it is possible to judge whether the lens is at an in-focus point or at a near-focus or far-focus point from the result of comparison of the outputs of the photoelectric conversion elements 10 and 11. Further, it is also possible to detect the degree of defocusing by finding the difference between the outputs of these elements 10 and 11.

Next, an example of the above stated focus detecting and display control circuit 12 is as illustrated in FIG. 4, wherein: A focus detection circuit 12A produces a detection output based on the output signals of the photoelectric conversion elements 10 and 11. The detection output varies in proportion to variation of the focusing state on an object, which is not shown. A display control circuit 12B controls the indicator 13 in response to the output signal from the focus detection circuit 12A. As will be further described hereinafter, the indicator 13 comprises three display elements 47, 48 and 49, which are light emitting diodes. The focus detecting and display control circuit 12 thus is composed of a combination of the focus detection circuit 12A and the display control circuit 12B.

The photoelectric conversion elements 10 and 11 are connected, respectively, to the input terminals of amplifiers 14 and 15. The output terminals of the amplifiers 14 and 15, moreover, are arranged to produce photo-electric output signals that are amplified by the actions of respective feedback resistors 16 and 17. Another amplifier 18 and resistors 19 and 20 are arranged to form an inverting amplifier circuit for inverting the output from the amplifier 15. Therefore, the output of the amplifier 15 which receives the output signal from the photoelectric convertor element 11 is converted code-wise by this inverting amplifier circuit. The inverted output of the amplifier 18 and the output of the amplifier 14 which receives the output signal of the photoelectric convertor element 10 are supplied to an addition circuit which is formed by resistors 21, 22 and 23 and an amplifier 24. Accordingly, the output of this addition circuit, or the output $\Delta V$ of the amplifier 24, corresponds to a difference between the outputs of the amplifiers 14 and 15.

Four comparators 25-28 receive reference voltage levels for signal comparison at potentials $V_4$, $V_3$, $V_2$ and $V_1$ which have been divided by resistors 29-34 to bear the relation $V_4 > V_3 > O > V_2 > V_1$. The above stated output $\Delta F$ of the amplifier 24 is supplied to the other input terminal of each of these comparators 25-28.

In this particular embodiment example, the level of the outputs of all comparators 25-28 become low when the output $\Delta V$ of the amplifier 24 is less than $V_1$. When the output $\Delta V$ exceeds $V_1$ but is less than $V_2$, the level of the output of the comparator 28 alone becomes high. When it exceeds $V_2$ but is less than $V_3$, the levels of the outputs of the comparators 28 and 27 become high. When it exceeds $V_3$ but is less than $V_4$, the levels of the outputs of all comparators but that of the comparator 25 become high. When it comes to exceeds $V_4$, the levels of the outputs of all of the comparators 25-28 become high. Table 1 shows the arrangement of the outputs of these comparators 25-28.

TABLE 1

| Level of $\Delta V$ | Output of 25 | Output of 26 | Output of 27 | Output of 28 |
|---|---|---|---|---|
| $\Delta \leq V_1$ | Low | Low | Low | Low |
| $V_1 < \Delta V \leq V_2$ | Low | Low | Low | High |
| $V_2 < \Delta V \leq V_3$ | Low | Low | High | High |
| $V_3 < \Delta V \leq V_4$ | Low | High | High | High |
| $V_4 < \Delta V$ | High | High | High | High |

As mentioned in the foregoing, there obtains the relation of $V_1 < V_2 < O < V_3 < V_4$. Then, as will be understood from the following description on the mode of display, in this embodiment example, the range of $V_2 < \Delta V \leq V_3$ is considered to be representative of an in-focus state. The range of $V_1 < \Delta V \leq V_2$ and that of $V_3 < \Delta V \leq V_4$ are considered slightly defocused states, which might be acceptable as within an in-focus range depending upon the photographing conditions. However, it is generally preferable to have $|V_2| = V_3$ and $|V_1| = V_4$. Further, the value of voltage is to be suitably determined in consideration of various factors such as the F number of the photograph taking lens, etc.

The connection point between the resistors 31 and 32 is at zero potential, i.e. grounded.

An amplifier 35 and resistors 36, 37 and 38 jointly form an addition circuit. With this arrangement, the outputs of the amplifiers 14 and 15 are summed up by this circuit. The addition output V of this circuit is then supplied to one of the input terminals of a comparator 39. The other input terminal of the comparator 39 is coupled to a predetermined reference potential $V_5$ which is produced at a connection point between a resistor 40 and a Zener diode 41. Therefore, the level of the output of the comparator 39 becomes high only when the output of the amplifier 35, i.e. the sum of the outputs of the amplifiers 14 and 15, is not lower than the predetermined level $V_5$. The reason for this arrangement is: The output $\Delta V$ of the amplifier 24 sometimes might become so small that it might cause an erroneous in-focus display even when the degree of defocus is very great. Such a possibility can be precluded by this arrangement.

The output of the comparator 39 is supplied to NAND gates 42-44. The gates 42-44 are enabled to permit control over the display only when the levels of the outputs of the gates 42-44 are permitted to become high by the supply of the output of the comparator 39, that is, only when the degree of defocus is not too much. On the other hand, when the degree of defocus is too much, the level of the above stated output becomes low and disables the NAND gates 42-44 to put the display under restraint.

Inverters 45 and 46 are arranged to invert the outputs of the comparators 25 and 27 respectively. The indicator 13 is provided with three display elements 47, 48 and 49, which are LEDs (light emitting diodes) in this embodiment of the invention. The current supply to these elements 47, 48 and 49 effected through resistors 50, 51 and 52 is controlled by the outputs of the NAND gates 42, 43 and 44 as the levels of these outputs become high or low. As will be understood, the display elements 47, 48 and 49 do not have to be light emitting diodes. Of the NAND gates 42-44, the NAND gate 42 is arranged to receive the output of the comparator 39 and that of the comparator 26. The NAND gate 43 is arranged to receive the output of the comparator 39, that of the comparator 28 and that of the inverter 45 while the NAND gate 44 is arranged to receive the output of the comparator 39 and that of the inverter 46 as illustrated in the drawing.

The circuit which is shown in FIG. 4 and arranged as described in the foregoing operates in the following manner:

When the level of the output of the comparator 39 is high and the output $\Delta V$ of the amplifier 24 is between $V_2$ and $V_3$, that is, when the output $\Delta V$ is close to a 0 level and, accordingly, the photographic lens 1 (FIG. 1) is in a correct in-focus position, the levels of the outputs of the comparators 27 and 28 are high and the levels of the outputs of the comparators 25 and 26 are low. Therefore, only the level of the output of the NAND gate 43 becomes low to energize the LED 48 only. Then the LED 48 alone is lit up to effect a precise display of an in-focus state.

On the other hand, when the level of the output of the comparator 39 is high and the output $\Delta V$ of the amplifier 24 is between $V_3$ and $V_4$, that is, when there obtains a somewhat defocused condition on the far-focusing side, the level of the output of the comparator 25 alone is low while the levels of all of others are high. Therefore, the levels of the outputs of both the NAND gates 42 and 43 become low to cause the LEDs 47 and 48 to light up.

With the defocused, far-focus condition, as the output $\Delta V$ of the amplifier 24 comes to exceed $V_4$, the levels of the outputs of all the comparators 25-28 become high to cause the level of the output of the NAND gate 42 alone to become low and this in turn cause the LED 47 alone to light up.

Conversely, under a defocused, near-focus condition, that is, when the output $\Delta V$ of the amplifier 24 is between $V_1$ and $V_2$, the level of the output of the comparator 28 alone in high. Therefore, the levels of the outputs of both the NAND gates 43 and 44 become low to cause the LEDs 48 and 49 to light up. When this defocus condition further advances and the output $\Delta V$ of the amplifier 24 becomes less than $V_1$, the levels of the outputs of all of the comparators 25-28 become low. Accordingly, the level of the output of the NAND gate 44 alone becomes low to cause the LED 49 alone to light up.

Further, when the output V of the amplifier 35 does not exceed the predetermined level $V_5$, that is, when there is an excessive defocus condition, the level of the output of the comparator 39 becomes low to completely restrain the display.

Thus, a detailed display is provided that reflects the defocusing direction and the degree of defocus as indicated in Table 2.

TABLE 2

| Focusing Degree and Direction | LED 47 | LED 48 | LED 49 |
| --- | --- | --- | --- |
| Complete defocus, near-focus side | Off | Off | Off |
| Near-focus | Off | Off | On |
| Slightly near-focus | Off | On | On |
| In-focus | Off | On | Off |
| Slightly far-focus | On | On | Off |
| Far-focus | On | Off | Off |
| Complete defocus, far-focus side | Off | Off | Off |

In this particular embodiment example, six kinds of display are performed with three LEDs. However, a number of variations of the display arrangement are possible. In one of such variations, for example, a display is performed in seven steps with seven LEDs operated individually. (In this case, among the seven LEDs, the one in the middle of the array displays an in-focus state.) In another exemplary variation, the directions and degree of focusing deviation may be displayed by using two LEDs for showing the directions of focusing deviation and a plurality of LEDs for showing the degree of such deviation.

A typical arrangement for the indicator 13 within a view finder of the camera is as shown in FIG. 5, in which, there is a field frame 54 for the view finder; a micro split prism 53 employed as a means for judging the optical focus and the LEDs 47-49.

As described in detail in the foregoing, in accordance with this invention, it is possible to obtain a system which has the following advantages:

(1) With the degree and directions of focusing adjustment being arranged to be visually observable in a stepwise manner, a focusing operation can be very easily carried out.

(2) The dispersed display facilitates observation.

(3) Simple in structural arrangement; not expensive; does not require much space; and has high reliability.

(4) The degree of focusing can be determined in relation to the desired depth of focus on an object to be photographed in accordance with the photographing intention and conditions. This is convenient for composing a picture.

While a preferred embodiment of the invention has been described, such description is for illustrative purposes only, and changes and variations may be made without departing from the spirit of the invention, for example: The focal point may be detected by detecting a distance to the object to be photographed and by comparing a detected distance datum thus obtained with a datum on the adjusted position of the image forming lens. Further, the display arrangement of the embodiment described in the foregoing may be changed in a finer stepwise display arrangement.

What is claimed is:

1. A device for detecting the focusing condition of an image forming optical system arranged to be focused on an object, comprising:
   (a) focus detecting circuit means for producing an electrical output which varies with change in the focusing condition of said image formed optical system to be focused on said object;
   (b) three display elements arranged to display the focusing condition of said image forming optical system to be focused on the object; and
   (c) display control circuit means for controlling the display by said three display elements on the basis of the electrical output of said focus detecting circuit means, said display control circuit means being arranged to actuate a first of said three display elements when the image forming optical system is focused onto a distance closer than said object, to actuate the first and a second of the elements when the optical system is focused onto a distance slightly closer than said object, to actuate the third of the elements when the optical system is focused onto a distance beyond said object and to actuate the second and third of the elements when the optical system is focused onto a distance slightly beyond said object.

2. A device according to claim 1, wherein said three display elements are arranged in a row; and the second of the three elements is positioned between the first and third elements.

3. A device according to claim 2, wherein said display control circuit means is arranged to actuate the second display element when the optical system is precisely in an in-focus condition.

4. A device according to claim 1, 2 or 3, wherein said display elements are light emitting elements.

5. A device according to claim 4, wherein said image forming optical system is a photo-taking lens system of a camera; and said display elements are arranged in said camera to permit observation of the display effected by the elements through a viewfinder of the camera.

6. A device according to claim 1, 2, or 3, wherein said image forming optical system is a photo-taking lens system of a camera; and said display elements are arranged in said camera to permit observation of the display effected by the elements through a viewfinder of the camera.

7. A device according to claim 1, wherein said focus detecting circuit means includes photoelectric means arranged to receive image light coming from said image forming optical system and said focus detecting circuit means is arranged to produce said electrical output by processing a photoelectric output of said photoelectric means.

8. A device according to claim 1 or 3, wherein said display control circuit means includes means for detecting that the focusing condition is outside a predetermined range which includes a far-focus condition and near-focus condition and for inhibiting the display of the focusing condition by the display elements when the optical system is in an out-of-focus condition outside the predetermined range.

* * * * *